Aug. 5, 1969         M. P. BEDKER         3,459,659
WASTE TREATMENT PROCESS AND APPARATUS
Filed March 13, 1968         2 Sheets-Sheet 2
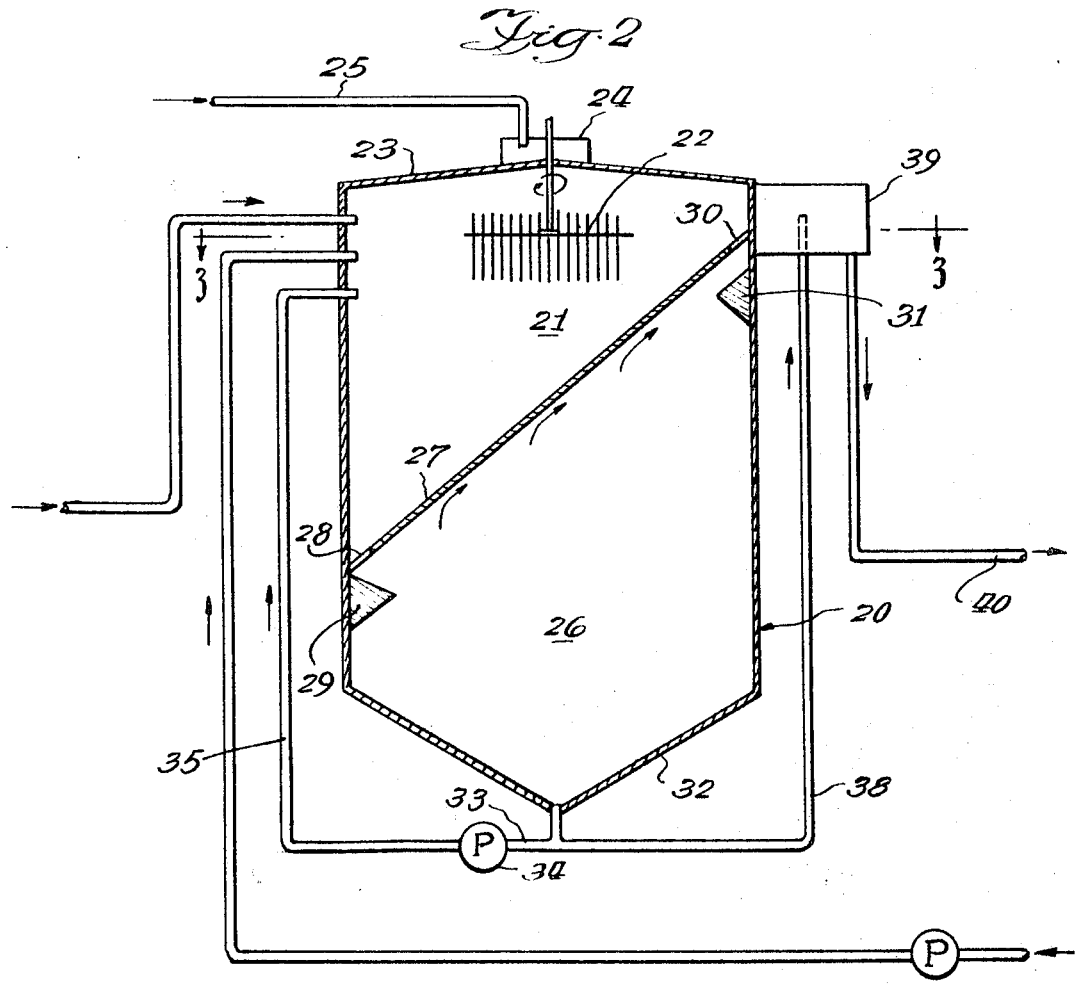
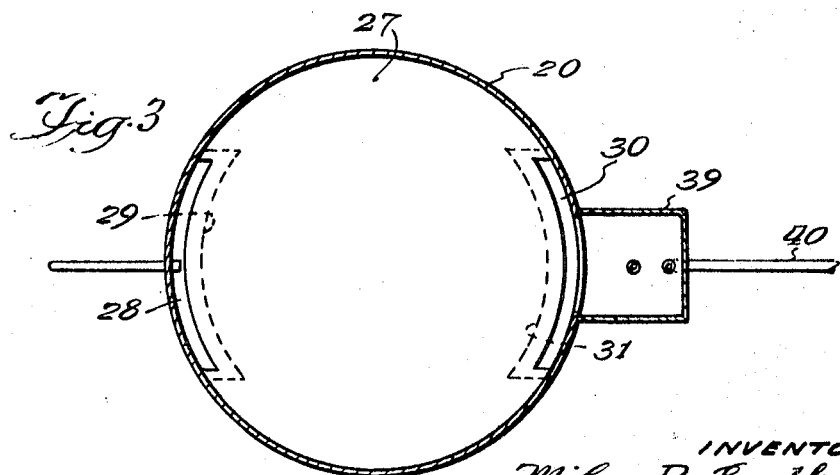
INVENTOR
*Miles P. Bedker*
BY *Dressler, Goldsmith, Clement & Gordon*
ATTORNEYS United States Patent Office 3,459,659
Patented Aug. 5, 1969

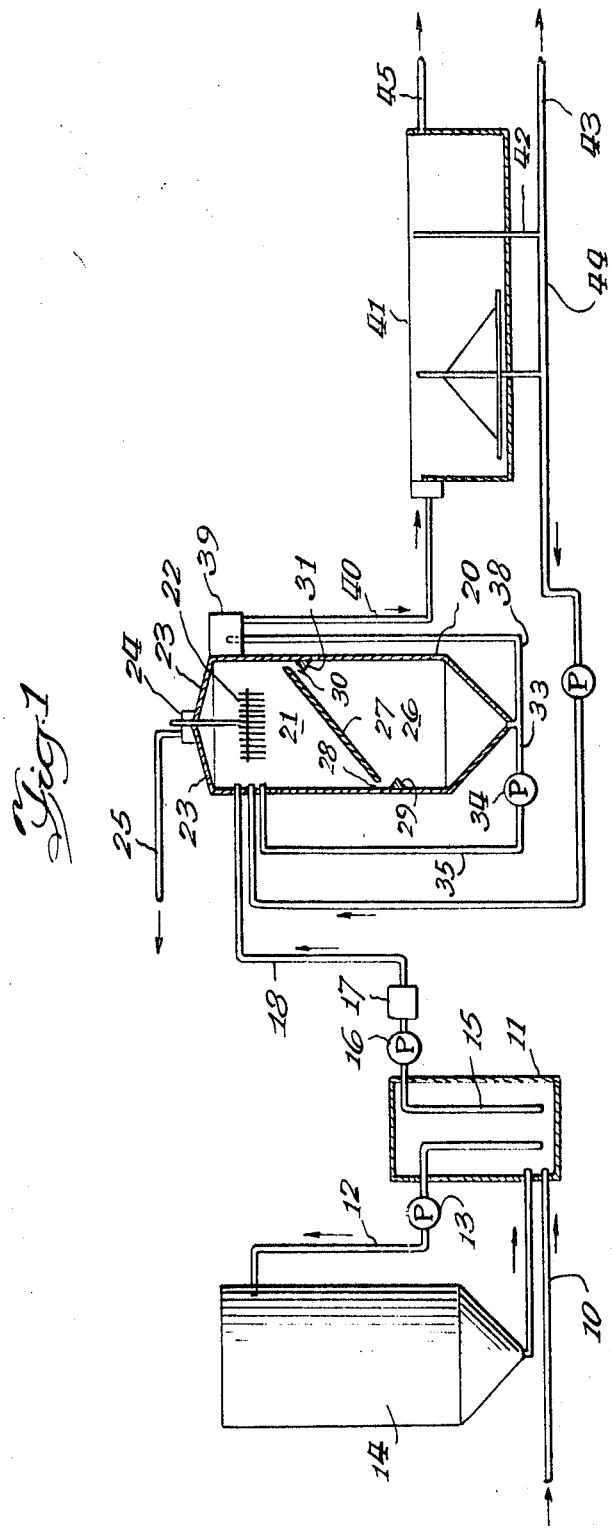

3,459,659
WASTE TREATMENT PROCESS AND APPARATUS
Miles P. Bedker, Albert Lea, Minn., assignor to Wilson & Co., Inc., a corporation of Delaware
Filed Mar. 13, 1968, Ser. No. 712,729
Int. Cl. C02c 1/06, 1/02
U.S. Cl. 210—3                    12 Claims

ABSTRACT OF THE DISCLOSURE

This application deals with an anaerobic process for treatment of waste materials wherein raw waste is introduced into the upper mixer-settler portion of a closed holder or tank which is divided into an upper portion and a lower digestion portion by a baffle angled transverse to the vertical axis. Communication is provided between the upper and lower portions at the low end of the baffle and adjacent the tank wall so that solids may move by gravity to the lower digestion portion of the tank. Communication is provided between the upper and lower portions at the elevationally higher end and adjacent the tank wall for degassing the digested liquor which operation serves the additional purpose of transferring floating solids to the upper portion of the unitary structure. Solids removed from the bottom of the lower digestion portion of the unitary tank are either returned to the mixer-settler portion of the unitary structure or to a sludge separator where a clarified supernatant is discharged to waste and the separated solids are either recycled or removed from the system.

This invention relates to an anaerobic process for the treatment of waste materials. More particularly, it relates to a system involving a mixing zone associated with a zone of gravity degasification and settling whereby the gas escapes through the mixing zone. Still more particularly, it relates to a multi-stage process for digestion of packing house wastes and to digester apparatus for use in the process.

Briefly, the invention comprises an anaerobic digestion process wherein recycle sludge from a final settling tank, digested sludge and heated raw waste are combined in the upper portion of a closed holder. This holder has an upper mixing zone and a communicating adjacent quiescent done, the uppermost portion of said quiescent zone being below the normal liquid level maintained in said closed holder. The two portions or zones of the holder communicate through laterally spaced and elevationally separated flow areas, the elevationally higher flow area being submerged below the normal liquid level being maintained in said holder. The mixture formed in said upper portion of said holder is agitated to obtain biological contact and then the mixture transfers to said quiescent zone by gravity through the lower flow area. Digestion of the waste products develops gas which passes out of the quiescent zone through the elevationally higher flow area. Digested waste products are discharged from the bottom of the quiescent zone to a final tank or settler from which a clarified effluent is discharged to waste. Sludge concentrate formed in this settler may be recycled to the mixer zone or discharged from the system.

The novel structure utilized in this process consists of a tank closed at the top and bottom to form a unitary structure. The tank is divided by an inclined divider wall extending across substantially the horizontal cross-sectional area into upper and lower portions with the elevationally higher end of said inclined divider positioned below the liquid level normally maintained in said tank. The divider wall or baffle is provided adjacent its lower end, preferably adjacent the tank wall with a port which is shielded from upward flow of gas bubbles. This port provides communication between the upper and lower portions of the tank so that solids may move by gravity to the lower quiescent digestion zone. At the elevationally higher end, the baffle is provided with an outlet also preferably adjacent the tank wall. This outlet which is submerged below the normal liquid level maintained in the mixer zone serves a double purpose of escape for gas and transfer of gas-floated solids back to the mixer zone. Gas escaping from the mixed liquor in the mixer zone either by naturally floating to the liquid surface or as result of freeing gas bubbles by agitation, collects in a gas dome for removal from the tank. The unitary tank is provided with inlet means for introducing waste material into the upper portion of said tank and with an outlet for fluid suspension at the bottom of said tank. The bottom of the tank which is preferably conical or hoppered has an outlet at the apex communicating with conduit which may be branched to provided duct means for discharge of the fluid suspension and piping means for transfer of fluid suspension from the lower to the upper portion of the tank.

The treatment of waste materials by anaerobic digestion methods has generally required elaborate methods to remove the gases formed in the digester and render the digested solids settleable. When gas forms in suspensions of solids, there is a tendency for the bubbles to adhere to the solids and cause the solids to float to the liquid surface. This seriously interferes with the necessary step of settling sludge and removing it from the treatment system.

The current methods utilized to remove this undesirable gas involves either air stripping or vacuum degasification. In the air stripping operation, diffused air is blown through digester mixed liquor. This air stripping results in the polluting of the atmosphere in the vicinity of the treatment plant with a mixture of gases having obnoxious odors.

In the vacuum degassing system, the mixed liquor of the digester flows upwardly to a tank maintained under a vacuum of about 20 inches of Hg. The liquor after entering the tank cascades down over galvanized steel slats. While flowing in thin films, the mixed liquor releases the gas which is removed through the vacuum system.

The apparatus necessary to accomplish degasification adds materially to the operating and capital costs of the waste treatment plants. The degasifier and appurtenances are expensive due to the corrosive nature of the gas being removed. Steel vessels such as the vacuum tank must be coated inside with a thermal setting resin. The slat trays must be protected as by being provided with a heavy galvanized coating of tin and zinc. The gas conduit systems must be corrosion resistant, for example, polyvinyl chloride resin tubing. The vacuum pumps, valves and gas safety equipment must be corrosion resisting metal such as 316 stainless steel. Even this type of gas safety equipment has shown a tendency to fail after a relatively short period of service.

Now it has been discovered that the equipment requirements of the system can be simplified and the expense of auxiliary equipment substantially eliminated and operating difficulties such as surges which disrupt the solids balance of the digestion system, can be eliminated by internal reconstruction of the digester and conversion to a simple venting or low pressure gas exhaust system in the settler-mixing portion of the digester.

In accordance with this invention, a method of treating, for example, packing house waste, is provided which effects a high degree of removal of B.O.D. The method involves a combination of operations in which raw waste enters the system at a pumping station having communication with a holding zone, i.e., flow equalization zone of the digester system. As the waste material moves to the digestion zone, it passes through a heating zone. Heated raw waste is introduced into the mixer zone positioned elevationally higher than the directly communicating digestion zone of the multi-stage digester unit, where the raw waste is agitated for uniform dissemination into a mixed liquor containing return sludge, i.e., sludge concentrate from a final settling tank and settled sludge returned from the accumulation area at the bottom of the digestion zone. Mixed liquor moves to the digestion zone through an open communication link at the elevationally lower end of an upwardly directed divider wall. Gas evolved during digestion is diverted along the underside of the upwardly directed divider wall to an outlet at the elevationally higher end of the wall and submerged below the normal liquid level in the mixer zone and then withdrawn from the free space above the normal liquid level therein. A solids concentrate accumulated in the bottom of the digestion zone is withdrawn and a portion thereof recycled to the mixer zone or the whole thereof discharged to a final settling tank. The solids separate in the settling zone to form a clarified supernatant liquor and a sludge concentrate. The clarified liquor and sludge concentrate are removed separately and a portion of the sludge concentrate is recycled as seed material and to maintain a desired solids content in the mixed liquor.

The purpose of the heater is to raise the temperature of the waste to the desired mesophilic range, preferably a temperature in the range between 90° F. and 96° F.

In the mixer zone the various components of the mixed liquor are brought into intimate contact by agitation, preferably in the form of mechanical mixing. Intimate contact results in a sharp decrease in biochemical oxygen demand. The preferred form of agitator consists of an open turbine rotor which can be, for example, 10 feet in diameter and rotate at a speed of 4 to 7 r.p.m. A typical rotor may have 1½ foot wide fins set radially at the outer periphery of a horizontal plate, with the fins extending upwardly 2 feet above the plate and about 4 feet below the plate.

In this agitated mixing zone, a suspended solids content in the range, preferably between 10,000 p.p.m. and 14,000 p.p.m. is maintained. To maintain such a suspended solids content, it is necessary if recycling a sludge of 12,000 to 17,000 p.p.m. to maintain a ratio of volume of return sludge to raw waste in the range between about 2.5 and about 5.

Mixed liquor formed in the mixer zone moves to the digestion zone through an open port at the elevationally lower end of the upwardly directed divider wall which is adjacent the unitary tank wall. This open port has a baffle adjacent it on the digester zone side thereof to divert gases so that they do not rise through the port and interfere with downward movement of the mixed liquor and associated solids.

As digestion of waste progresses in the elevationally lower digestion zone, gas is evolved. The gas rises through the liquor in the flooded digestion zone, and along the underside of the divider wall to an outlet at the elevationally higher end of the wall. This outlet is adjacent the unitary tank wall and submerged below the normal liquid level of the mixer zone. This gas in transferring from the digestion zone to the mixer zone transfers floating solids to the mixing zone where the agitation can liberate the gas bubbles. The freed gas accumulates in a free space provided above the normal liquid level of the mixer zone, preferably in the form of a gas collecting dome from which the gas is withdrawn either for wasting or for use as fuel for the heater unit.

When digested solids are removed from the multi-stage digestion tank, the solids have been in the mixer plus digester portions of the tank for a period of time in the range between about 12 hours and 24 hours based upon the time influent raw feed is in the tank.

When a raw waste from a packing plant, ranging from 1000 and 2000 mg./liter of B.O.D. is being digested over a 24 hour period, the solids content in the digester will range up to 7500 mg./liter. Digestion of such packing house raw waste within the holding times specified requires a digestion tank of the type hereinafter described having a digestion tank volume of approximately 0.5 to 1 times the daily volume of influent flow (gallons per day). Changes in digestion time, type of raw waste, volume of recycle, etc., may require greater ratios of digestion tank volume to influent flow volume but, in general, the ratio seldom need be greater than between 5 to 10.

When an influent sewage having an average B.O.D. of 1000 p.p.m. is delivered over a period of 8 hours to a mixer portion of the multi-stage tank where a solids content of 14,000 p.p.m. is being maintained by recirculation of digested solids and recycle sludge, and the total residence time in the digestion tank is 4.2 hours (based on raw plus return sludge), the digested solids and mixed liquor discharged to the final tank will produce a clarified effluent having an average B.O.D. of 60 p.p.m.

The invention will be fully understood from the following description, illustrated by the accompanying drawings in which:

FIGURE 1 illustrates the waste treating system embodying the present invention, the parts being shown diagrammatically and in section;

FIGURE 2 is a vertical cross-sectional view of a digester tank of circular cross section; and FIGURE 3 is a top plan view along the line 3—3 of FIGURE 2.

Referring more particularly to the drawings, the numeral 10 indicates a conduit through which raw waste, such as packing house waste or sewage enters a pumping station 11. If the volume of flow is in excess of requirements of the digestion operation, waste is delivered through piping 12 and pump 13 to holding tank 14.

Raw waste or a combination of raw waste and waste temporarily stored in holding tank 14 passes from pumping station 11 through pipe 15, pump 16, heater 17 and pipe 18 to digester unit 20.

In digester unit 20, waste is commingled with the contents of mixer zone 21 by an open turbine rotor 22 rotated by a suitable source of power not shown.

Digester unit 20 is a closed tank having a suitable cover 23 either of the fixed or floating type which includes a gas collection dome 24, said dome communicating with a gas drawoff line 25. Digester unit 20 is divided into mixer zone 21 and quiescent digester zone 26 by a divider wall 27. Divider wall 27 is provided at the low end with a port 28. Port 28 has adjacent thereto and vertically below it a baffle 29. At its elevationally higher end, divider wall 27 has an opening 30 and adjacent thereto a baffle member 31.

Digester unit 20 is adapted with a conical bottom 32. An aqueous sludge concentrate collects in conical bottom 32. Aqueous sludge concentrate is withdrawn intermittently or continuously from conical bottom 32 through line 33 and discharged through line 35 into the mixer zone 21 by pump 34 which may be of the variable speed type or adapted with controls for intermittent operation. Conical bottom 32 also communicates with the independent conduit 38 which conveys aqueous sludge concentrate to a surge tank 39 which is installed to maintain liquid level in digester unit 20.

Solids suspension, i.e., digested mixed liquor may be pumped or flow by gravity from surge tank 39 through conduit 40 to final settler 41.

In settler 41, which may be of any suitable shape, digested sludge settles on the bottom of the tank for conventional collection and drawoff through sludge drawoff line 42 communicating with the bottom of the settling tank. The digested sludge may then be fed via line 43 to sludge drying beds or may be carried through line 44 to the mixer zone 21 of digester unit 20 where the digested solids are mixed with incoming undigested sludge to seed same and further enhance the digestion process.

The supernatant liquor which concentrates in the upper portion of settling tank 41 may be suitably withdrawn by one or more withdrawal lines 45 for wasting from the system.

The volume of the settling tank 41 should provide a detention period of not to exceed 24 hours and the digestion process is deemed complete when the volatile solids are reduced by about 40% to about 55%.

The above-detailed description of this invention has been given by way of illustration without any intention that the invention be limited to the exact conditions and details set forth. No unnecessary limitations should be understood therefrom as modifications will be obvious to those skilled in the art.

I claim:
1. In an anaerobic process for digestion of waste material, the steps comprising heating aqueous waste material to a temperature in the range between 90° F. and 96° F., introducing said heated aqueous waste material into the upper portion of a closed holder for mixed liquor containing recycle sludge and digested solids to form a mixed liquor mixture, said holder having an upper mixing zone and a lower quiescent zone in open communication through laterally spaced and elevationally separated flow areas whereby the quantities of aqueous waste material, recycle sludge and digester solids received in said upper mixing zone sustain a liquid level in said mixing zone which maintains the lower quiescent zone in a flooded condition and the elevationally higher flow area submerged, agitating said mixture in said mixing zone to obtain biological contact, transferring mixture from said mixing zone to said lower quiescent zone by gravity through the elevationally lower flow area, holding said mixture in said quiescent zone for a period of digestion during which gas is formed, directing the upwardly moving gas to the elevationally higher flow area whereby the gas and associated solids transfer to the mixed liquor mixture in said mixing zone, removing gas accumulating above the liquid level in said mixing zone, removing at least a portion of the digested sludge from said quiescent zone and introducing the same into a settling zone, removing sludge solids from said settling zone and recycling at least a portion thereof to said mixing zone and separately discharging clarified effluent from said settling zone.

2. An anaerobic process for digestion of waste material according to claim 1 wherein said waste material is packing house waste.

3. An anaerobic process for digestion of waste material according to claim 1 wherein said influent waste material is mixed with previous received waste in a holding zone prior to heating and introduction into the upper mixing zone.

4. An anaerobic process for digestion of waste material according to claim 1 wherein the mixture traveling to said lower quiescent zone and gas moving to said upper mixing zone are provided with circuitous paths so that movement from one zone to the other zone does not interfere with the operation of either zone.

5. An anaerobic process for digestion of waste material according to claim 1 wherein the temperature of waste material entering said mixing zone has a temperature in the range between 90° F. and 96° F.

6. An anaerobic process for digestion of waste material according to claim 1 wherein the solids concentration maintained in the mixing zone is in the range between about 10,000 and 14,000 p.p.m.

7. Apparatus for the anaerobic digestion of aqueous waste material comprising a tank closed at the top and bottom, an inclined divider wall extending across substantially the horizontal cross-sectional area and separating said tank into upper and lower portions with the higher end positioned below the liquid level normally maintained in said tank, a port adjacent the lower end of said divider wall at a point shielded from upward flow of gas bubbles, an outlet adjacent the higher end of said divider wall, inlet means for introducing influent waste material into the upper portion of said tank, means communicating with the area at the top of said tank for removing gas accumulated therein, an outlet for fluid suspension at the bottom of said tank, conduit means communicating with said lower portion of the tank through said outlet for fluid suspension, duct means connecting with said conduit means for discharge of said fluid suspension, and piping means connecting with said conduit means for transfer of fluid suspension from said lower to said upper portion of said tank.

8. Apparatus according to claim 7 wherein the closure for the top of said tank includes a gas dome and said means for removing gas communicating with said gas dome.

9. Apparatus according to claim 7 wherein the port adjacent the low end and the outlet adjacent the high end of the divider wall have elevationally below them baffles shielding said port and said outlet against direct flow of gas bubbles.

10. Apparatus according to claim 7 wherein the upper portion of said tank is provided with mechanical mixing means.

11. Apparatus according to claim 7 wherein said tank is provided with liquid flow conducting means communicating at one end with the upper portion of said tank and at the other end with a holder of sludge concentrate.

12. Apparatus according to claim 7 wherein said tank is provided with a recycle pipe for return of sludge from a separate settling tank to said upper portion of said tank.

References Cited

UNITED STATES PATENTS

| | | | |
|---|---|---|---|
| 1,399,561 | 12/1921 | Imhoff et al. | 210—4 |
| 2,777,815 | 1/1957 | Forrest | 210—3 |
| 2,889,929 | 6/1959 | Kivell | 210—194 |

MICHAEL E. ROGERS, Primary Examiner

U.S. Cl. X.R.

210—12, 14, 180, 195, 261